United States Patent [19]
Bertolasi

[11] 3,906,345
[45] Sept. 16, 1975

[54] ELECTRO OPTICAL METER SYSTEM HAVING A SERIES LIGHTING DISPLAY AND MATRIX SCANNING

[75] Inventor: Robert B. Bertolasi, Rockford, Ill.

[73] Assignee: Kelsey-Hayes Company, Romulus, Mich.

[22] Filed: Aug. 3, 1973

[21] Appl. No.: 385,414

[52] U.S. Cl. ............. 324/166; 340/325; 235/92 EA
[51] Int. Cl.² ...................... G01P 3/48; G08B 23/00
[58] Field of Search ........... 324/161, 166, 169, 170, 324/172–175, 99 D, 78 D, 96, 122, 133, 79 D; 235/92 EA, 92 FQ, 92 DN, 92 TF, 92 AE; 307/311; 340/168 SR, 325, 379, 263

[56] References Cited
UNITED STATES PATENTS

| | | | |
|---|---|---|---|
| 3,619,574 | 11/1971 | Mindheim | 324/96 |
| 3,639,753 | 2/1972 | Reich | 324/166 |
| 3,754,121 | 8/1973 | Delay | 324/166 |
| 3,771,122 | 8/1972 | Sattler | 324/161 |
| 3,825,827 | 7/1974 | Tumbush | 324/96 |

FOREIGN PATENTS OR APPLICATIONS

| | | | |
|---|---|---|---|
| 2,248,917 | 4/1973 | Germany | 324/166 |

Primary Examiner—Robert J. Corcoran
Assistant Examiner—Rolf Hille
Attorney, Agent, or Firm—Harness, Dickey & Pierce

[57] ABSTRACT

An electro-optical meter system for visually displaying via a linear array of light emitting diodes, the value of a parameter being measured. Individual diodes in the array are intermittently and repetitively energized via a matrix scanning circuit which receives as an input a signal having a characteristic representing the value of the parameter being measured. The array appears to an observer as a line, or column, of light wherein the individual elements appear to be continuously lighted. The number of elements lighted establishes the length of the lighted column, and hence, represents the value of the parameter being measured. In addition to the novel matrix scanning technique, the invention features a novel alarm circuit for indicating when the value of the parameter exceeds a certain level and a novel illumination control for providing substantially invariant intensity of the diodes even though the duty cycle of each diode may vary appreciably as the value of the parameter varies.

42 Claims, 2 Drawing Figures

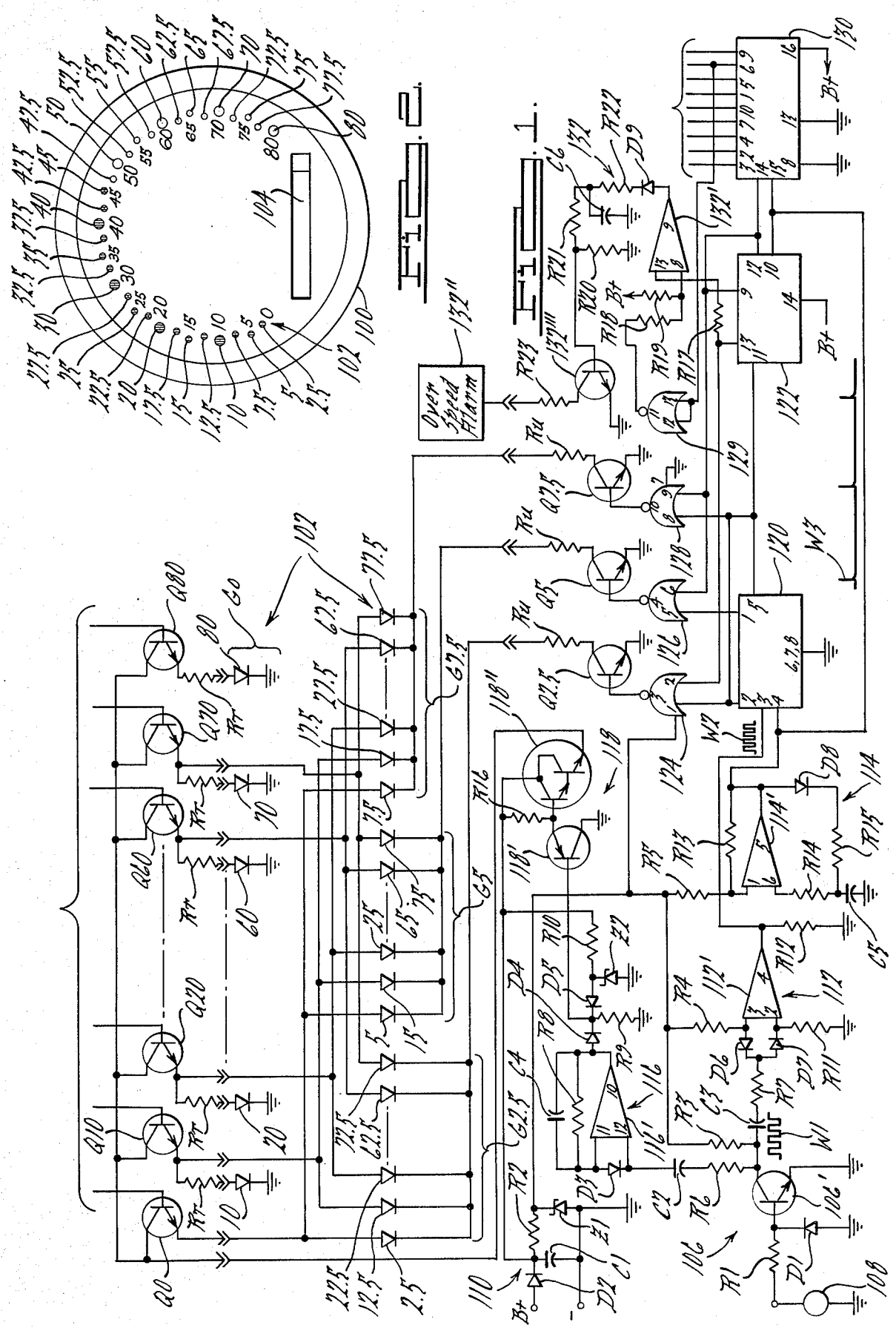

ELECTRO OPTICAL METER SYSTEM HAVING A SERIES LIGHTING DISPLAY AND MATRIX SCANNING

BACKGROUND OF THE INVENTION

The present invention pertains generally to information processing and display systems and specifically to a novel electrooptical metering system having novel matrix scanning. The invention is especially well suited for application in automobile metering systems such as speedometer systems.

Mechanical and electromechanical meters have long been used in information processing and display systems. Typically, such systems translate an analogue signal, which represents the value of a parameter being measured, into mechanical deflection of a needle which may be read against a calibrated scale. This type of system suffers from many deficiencies which are well known and need not be elaborated upon here. In attempts to improve upon systems of this type, electrooptical systems have been proposed. Such an electrooptical system may comprise, for example, a linear array of individual light emitting elements, typically and preferably light emitting diodes. The condition of the individual elements in the array (i.e., either lighted or unlighted) is used to indicate the value of the parameter being measured. Various techniques have heretofore been used in electro-optical systems to indicate the value of the parameter. One technique is to light only a single element of the array at one time, the particular element being lighted serving to indicate the value of the parameter. Another technique is to simultaneously light a number of consecutive elements in the array, the number of elements being lighted forming a lighted line, or lighted column, whose length indicates the value of the parameter. The former technique is sometimes referred to as a discrete lighting display and the latter sometimes as a series lighting display. In prior systems of the series lighting display type, relatively complicated, and hence relatively expensive, circuitry is required.

One method which has been used in both series and discrete lighting display systems for developing the value of the parameter being measured is to provide a repetitive signal whose repetition rate represents the value of the parameter. The number of times that the signal occurs during a fixed timing period provides a measurement of the value of the parameter. Therefore, according to this method, prior systems of both series and discrete display types have embodied a counter circuit for counting the number of occurrences of a repetitive signal during a fixed timing period. The counter circuit may typically have a less significant digit counter section (i.e., a units counter) and a more significant digit counter section (i.e., a tens counter). In a discrete lighting display system the count thus taken during each timing period is processed by additional circuitry including a decoding circuit to energize a particular one of the elements in the display. In this way the position of the single lighted element on the display indicates the value of the parameter. A new timing period is thereafter commenced for subsequent updating of the count in the counter circuit and hence of the display. One disadvantage attributed by many authorities to the discrete lighting display is that such a display is not as readily readable as is a series lighting display.

However, in prior series lighting display systems it has heretofore been necessary to use relatively complicated, and hence relatively expensive, circuitry for energizing elements of the display in accordance with the count taken by the counter circuit. In one version of series lighting display, a memory circuit is provided between the counter circuit and the elements of the display. At the conclusion of each timing period the count in the counter circuit is transferred to the memory circuit and the memory circuit energizes the appropriate elements in the display via a decoding circuit. In this way the energized elements form a lighted column whose length represents the value of the parameter. A new timing period is thereafter commenced for subsequent updating of the count and of the display. This version of series lighting display is much like the version of discrete lighting display described above. However, the circuitry required is much more complicated. Another version of series lighting display utilizes individual buffer/driver circuits operatively coupling the counter circuit with the elements in the display. Each buffer/driver circuit is individual to one of the elements in the display. The buffer/drivers and the elements in the display are connected such that when one buffer/driver is energized from the counter circuit, it energizes not only the element in the display to which it is individual, but also those buffer/drivers operatively coupled with all "less than" elements in the display, thereby energizing all less than elements in the display. This version has the disadvantage of requiring an individual buffer/driver for each element in the display, and hence in a display having a large number of elements, the cost of this type system for the most part becomes prohibitive.

In contrast to the prior art as represented by the foregoing techniques, the present invention provides a series lighting display system in which the display appears to an observer as a continuously lighted column whose length represents the value of the parameter (and hence appears the same as the prior series lighting displays) but which operates on entirely different concepts. One especially significant conceptual difference between the present invention and the prior art resides in the technique by which the appropriate elements in the display are energized. As a result, a system according to the concepts of the present invention requires much less complicated circuitry and therefore, has the distinct benefit of rendering series lighting display systems economically practicable in mass production application such as in automotive metering systems (i.e., automobile speedometers, etc.). The present invention arises in part through the recognition and application of a certain physiological phenomenon inherent in the human optical system. According to this phenomenon the optical system of a human being can retain an image of an object for a short time, on the order of 1/20th of a second, after the object has been removed from sight. Through appreciation of this phenomenon, it has been found to be wholly unnecessary to provide continuous energization of individual elements in a series lighting display. Hence, according to one aspect of the present invention, the individual elements in a series lighting display are intermittently but repetitively energized at a rate sufficient to create the impression to a human observer that the elements are being continuously energized. This technique for energizing the elements in an array is referred to herein as "matrix scanning". By use of this matrix scanning technique, as opposed to the techniques described above in the prior art, the complexity of the circuitry for a series lighting display type system is greatly reduced. Therefore, a system embodying principles of the present invention can be both more economically and more reliably constructed out of a fewer number of individual components. Furthermore, according to a further aspect of the invention, a series lighting display is provided with a novel illumination control wherein variations of the intensity of light emitted by individual elements of the display are substantially minimized, or eliminated, even though the duty cycle to which the individual elements are subjected may vary widely over the operating range of the display system. In addition, the invention also provides a novel alarm circuit for providing an alarm when the value of the parameter being measured exceeds a predetermined value. Also, the invention provides a novel calibrating means for accommodating a plurality of different tire sizes when the invention is applied to an automotive vehicle speedometer system.

The foregoing features of the invention, along with additional advantages and benefits thereof, will be seen in the ensuing description and claims which are to be taken in conjunction with the accompanying drawing.

BRIEF DESCRIPTION OF THE DRAWINGS

The drawing illustrates a preferred embodiment of the invention in accordance with the best mode presently contemplated for carrying out the invention.

FIG. 1 is an electronic schematic diagram of an exemplary but presently preferred embodiment of speedometer according to the present invention.

FIG. 2 is a view of the visual speedometer display which displays speed information derived from the circuit of FIG. 1.

DESCRIPTION OF THE PREFERRED EMBODIMENT

In FIG. 2 of the drawing a speedometer dial 100 has a graduated circular speed scale thereon having a range from 0 miles per hour up through 80 miles per hour and numbered in 5 mile per hour increments. A one dimensional matrix display of light emitting diodes (hereinafter referred to as LED's) is arranged in a linear circular array 102 along the range of the speed scale on dial 100. The array 102 is coextensive with the speed scale range (with the exception of the 0 mile per hour designation on the scale) and comprises a plurality of 32 individual LED's identified by the numerals 2.5, 5, 7.5, 10, 12.5, . . . 75, 77.5, and 80. Thus the individual LED's are equally spaced along the speed scale and arranged to provide a resolution of 2½ miles per hour as read against the speed scale on dial 100. Briefly, the invention provides a novel electronic speedometer which intermittently and repetitively energizes a selected number of LED's along array 102 such that the matrix display appears as a continuously lighted line, or column, extending from LED 2.5 to the LED corresponding to the speed of the vehicle. FIG. 2 illustrates LED 2.5 up through LED 45 as being lighted to thereby indicate a vehicle speed of between 45 and 47½ miles per hour. As illustrated in the drawing the LED's are of the type which emit red light, thereby providing a convenient and readable indication on the dial, although it will be appreciated that LED's emitting other lighted colors, such as yellow or green, could also be used. An odometer 104 which may be of the type disclosed in U.S. Pat. No. 3,739,270, issued to Roger L. Miller, June 12, 1973, and assigned to the same assignee as the present application is also shown in association with the speedometer in FIG. 2. The odometer features an interchangeable calibrating means for accommodating a plurality of vehicle tire sizes and as will be seen hereinafter the speedometer disclosed in the present application provides a novel calibrating means for accommodating a plurality of vehicle tire sizes. In FIG. 1 the individual LED's which constitute matrix array 102 are arranged in groups identified as G0 G2.5, G5, and G7.5. The remainder of the circuit of FIG. 1 operates array 102 to provide the aforementioned visual display of vehicle speed.

The circuit in FIG. 1 comprises an input amplifier and squaring circuit 106 which receives an input signal from a speed sensor 108 which is driven by an element of the vehicle indicative of vehicle speed. For example, sensor 108 can take the form of a speed sensor of the type disclosed in U.S. Pat. No. 3,604,966, issued to John V. Liggett, Sept. 14, 1971, and assigned to the same assignee as the present application. This sensor provides a signal whose frequency, or repetition rate, represents the speed of the vehicle. Circuit 106 comprises a resistor R1, a diode D1, and a transistor 106' connected as illustrated. When sensor 108 is being rotated, an output signal waveform (such as indicated by way of example as W1) is generated at the collector of transistor Q1. As can be seen, the signal W1 is of substantially square waveform, thereby providing a relatively uniform signal for use by the remainder of the circuit.

A regulating circuit 110 comprising a conventional diode D2, a capacitor C1, a resistor R2 and a zener diode Z1 connected as illustrated supplies regulated power at suitable voltage levels for various sections of the circuit. The reference voltage developed across zener diode Z1 is supplied through a resistor R3 to circuit 106, and through resistors R2 and R5 respectively to a frequency doubling circuit 112 and a timing oscillator circuit 114 respectively. The voltage appearing across capacitor C1 is supplied to additional circuitry to be described later. This additional circuitry includes a tach circuit 116 and an illumination control amplifier circuit 118.

Waveform W1 is supplied from circuit 106 to both frequency doubling circuit 112 and to tach circuit 116. The signal is supplied through a resistor R6 and a capacitor C2 to circuit 116 and through a capacitor C3 and a resistor R7 to frequency doubling circuit 112. Portions of circuits 112, 114 and 116 in the preferred embodiment are constructed from a single circuit module (identified by model number and manufacturer in the parts list at the conclusion of the specification) having several individual circuits thereon. The particular circuit of the module used in circuit 112 is identified by the numeral 112' and the terminals identified thereon in the drawing correspond to the manufacturer's terminal designations for this particular module. Similarly, the circuit portion of the module used in circuit 114 is identified by the numeral 114' and the circuit portion of the module used in circuit 116 is identified by the numeral 116'. The terminal designations on the drawing for circuits 114' and 116' correspond to the manufacturer's designations. Circuit 116 further includes diodes D3, D4, D5, a zener diode Z2, resistors R8, R9, R10 and a capacitor C4 connected with circuit 116' as illustrated. Circuit 112 further includes diodes D6, D7, and resistors R11, R12 connected with circuit 112' as illustrated. Circuit 114 includes resistors R13, R14, R15, a capacitor C5, and a diode D8 connected with circuit 114' as illustrated.

Having now described the various elements constituting the circuits 112, 114, 116 and 118, the functions of these four circuits can be briefly stated. Frequency doubling circuit 112 is responsive to the leading and trailing edges of waveform W1 to develop a waveform W2 whose frequency is equal to twice the frequency of waveform W1. Waveform W2 is supplied to the novel matrix scanning circuit hereinafter described in greater detail. Circuit 114 is a timing circuit which provides an output waveform W3. Waveform W3 is a repetitive pulse which is generated at a constant predetermined timing interval. Waveform W3 as will be seen later is also supplied to the novel matrix scanning circuit. Circuit 114 is supplied from zener diode Z1 and hence provides very accurate timing. Circuits 116 and 118 should be considered together. Circuit 116 provides a variable reference voltage to circuit 118 which voltage is dependent upon the frequency of waveform W1. Circuit 118 amplifies the output of circuit 116. As will be seen later, circuits 116 and 118 provide substantially constant illumination intensity for the individual LED's in array 102 even though the duty cycle of the individual elements of the array can vary widely.

Attention can now be focused on the novel matrix scanning feature of the present invention. Circuits 120, 122, 124, 126, 128 and 130 constitute a two digit counter. Circuits 120, 122, 124, 126 and 128 count the less significant digit; circuit 130 the more significant digit. Circuits 120 and 122 are contained in a single module identified hereinafter in the parts list and circuits 124, 126 and 128 are also contained in a single module also identified in the parts list. Circuit 130 is a single module also identified in the parts list. The terminal pin identification shown on the drawing for these circuits corresponds to the manufacturer's designation. When these circuits are connected as illustrated in the drawing, the leading edge of each pulse in waveform W2 advances the count by one in the counter. The less significant digit counter has a modulus four counting capacity. In other words, it makes one complete cycle for every four pulses in waveform W2. The more significant digit counter (i.e. circuit 130) has a modulus ten counting capacity. In other words, circuit 130 makes one complete cycle for every 10 pulses received at its input. However, circuit 130 receives an input as a carry from the less significant digit counter for every four pulses in waveform W2. The lesser significant digit counter has three output lines which are at the outputs of circuits 124, 126 and 128 respectively. Circuit 130 has ten individual outputs but only nine of these are utilized in the present invention. These outputs are identified by terminal pins 3, 2, 4, 7, 10, 1, 5, 6 and 9 in the drawing and these represent digits zero through eight respectively. Each pulse of waveform W3 resets both the more significant and the less significant digit counter. With both counters reset, the less significant digit counter has no output signal at any of its three outputs while circuit 130 has a signal only at the zero digit output (i.e., at terminal pin 3).

Attention is now directed to further detail of the matrix scanning circuit which connects the counter with the LED's. The LED's, as mentioned earlier, are arranged in four groups, G0, G2.5, G5, and G7.5. The LED's in group G0 represent whole multiples of ten miles per hour on the speedometer and accordingly are located at 10, 20, . . . etc. mile per hour marks on the dial. Each of the LED's in group G0 is operatively coupled via a "more significant digit" transistor driver circuit with a corresponding one of the terminal pins of counter 130. These transistor driver circuits are identical. As can be seen in the drawing, each respective LED 10, LED 20,... LED 70, LED 80 has a transistor circuit comprising a resistor $R_T$ and a respective transistor Q10, Q20, . . . Q70, Q80. The collectors of all transistors Q10 . . . Q80 are supplied from circuit 118. The emitter of each respective transistor Q10 . . . Q80 connects through its associated resistor $R_T$ to its respective LED 10 . . . LED 80. The base of each respective transistor Q10 . . . Q80 is coupled to a respective terminal pin 2, 3, . . . 6, 9 of circuit 130. While there is no LED for the 0 mile per hour mark on the speedometer, a transistor Q0 has its base connected to terminal pin 3 of circuit 130 and its collector in common with the collectors of the other transistors. Additionally, each of the transistors Q0, Q10 . . . Q80 has connected to its emitter circuit a respective one of the LED's in each of the groups G2.5, G5, and G7.5. Thus the emitter of transistor Q0 connects to the anodes of LED 2.5, LED 5 and LED 7.5; the emitter of transistor Q10 to the anodes of LED 12.5, LED 15 and LED 17.5; etc.

The cathodes of the LED's in each group G2.5, G5, G7.5 are connected together via a "less significant digit" transistor driver circuit with a respective one of the circuits 124, 126, 128. The less significant digit counter counts in units of two and one-half miles per hour. The cathodes of the LED's in group G2.5 connect through a resistor $R_{L'}$ to the collector of a transistor Q2.5 which is associated with circuit 124; the cathodes of the LED's in group G5 through a resistor $R_{L'}$ to the collector of a transistor Q5 which is associated with circuit 126; and LED's in group G7.5 through a resistor $R_{L'}$ to the collector of a transistor Q7.5 which is associated with circuit 128. The outputs of the respective circuits 124, 126, 128 connect to the bases of the respective transistors Q2.5, Q5 and Q7.5. These circuits are arranged such that when a signal is present at the output of one of the circuits 124, 126, 128 the respective transistor Q2.5, Q5, Q7.5 is rendered conductive. Thus from consideration of the foregoing description, it can be seen that an individual LED can be energized only when the transistor coupled to its anode and the transistor coupled to its cathode are both simultaneously biased for conduction; in other words only when both its more significant digit transistor and its less significant digit transistor are both on. Basically then the counting circuit provides a coded signal used to energize elements in the array. As the count increases, the coded signal changes in accordance with the count and this provides scanning of the array during the counting process.

The novel matrix scanning feature of the present invention can now be more fully understood and appreciated. Let it be assumed that the vehicle speed is 45 miles per hour. As sensor 108 supplies an input signal to the circuit it causes pulses to be supplied in the form of waveform W2 to the counting circuit. At the beginning of a timing period, the counter has been reset to zero by waveform W3 of circuit 114. Since transistor Q0 is also biased for conduction, LED's 2.5, 5 and 7.5 are enabled to be energized. As the first pulse in waveform W2 is applied to circuit 120, transistor Q2.5 is biased for conduction, and since transistor Q0 is simultaneouly biased for conduction, LED 2.5 is energized and thereby illuminated. As the second pulse of waveform W2 is received, the transistor Q2.5 turns off thereby de-energizing LED 2.5 and at the same time transistor Q5 is biased for conduction thereby energizing LED 5. When the third pulse of waveform W2 arrives, transistor Q7.5 is similarly biased for conduction to similarly energize LED 7.5. When the fourth pulse of waveform W2 arrives, none of the transistors Q2.5, Q5 and Q7.5 is energized. Since a carry is now transferred from the lesser significant digit counter to the more significant digit counter 130, this causes the signal at terminal pin 3 of circuit 130 to move to terminal pin 2 which biases transistor Q10 for conduction. Since LED 10 is directly connected to the emitter of transistor Q10, LED 10 now lights. When the fifth pulse in waveform W2 arrives, transistor Q2.5 is again biased for conduction, and since transistor Q10 is simultaneously biased for conduction LED 12.5 is energized. Similarly when the sixth and seventh pulses in waveform W2 arrive, LED 15 and LED 17.5 are respectively energized. Note that LED 10 remains energized while the LED's 12.5, 15 and 17.5 are being energized. When the eighth pulse of W2 waveform arrives, a carry is made to counter 130 and only LED 20 is energized. From this pattern of operation, it can be seen that the individual LED's in the array are intermittently sequentially energized in the direction of increasing vehicle speed up to the 45 mile per hour speed which has been assumed with the first LED at the beginning of each ten mile per hour segment (i.e., LED 10, LED 20, etc.) remaining energized while the immediately three succeeding LED's are being scanned. When the timing period defined by waveform W3 has elapsed, LED 45 is the most recent LED having been energized. The counter is reset immediately by waveform W3 and the next counting cycle begins. So long as the vehicle speed remains between 45 and 47½ miles per hour, LED's 2.5 through 45 continue to be sequentially energized (i.e., continue to be scanned, or strobed) as just described. The rate at which scanning takes place is such that even though the individual LED's are only energized for a small fraction of each timing period, the array presents to a human observer the appearance of being a continuously lighted column because of the aforementioned physiological image retention phenomenon inherent in the human optical system.

Furthermore, the system operates such that even though the duty cycle of an individual LED varies in accordance with the number of pulses counted during a timing period, the array always appears as a column of light of substantially uniform intentisy whose length indicates the speed of the vehicle. Because of timing period defined by waveform W3 is of fixed duration, the duty cycle of each LED depends upon the value of vehicle speed. In other words, the higher the vehicle speed, the smaller the fraction of each timing period for which each individual LED is energized. However, in accordance with a further feature of the present invention, the display exhibits a substantially uniform intensity of illumination in spite of variation in the duty cycle of the individual LED's. This is provided by circuits 116, 118 which can now be described in greater detail.

Tach circuit 116 provides a variable voltage output which is amplified by amplifier control circuit 118. Circuit 118 includes a resistor R16, a transistor 118' and a high gain transistor 118'' which are operatively connected as illustrated to circuit 116 and to the collectors of the transistors Q0, Q10 . . . Q80. Tach circuit 116 provides an output signal to the base of transistor 118' which is a function of the frequency of waveform W1. This signal has one of two components. One component is a fixed voltage provided by zener diode Z2 as supplied through diode D5. The other component is provided by the output of circuit 116' as supplied through diode D4. Circuit 116' operates to provide an output voltage which varies with the repetition rate of the pulses of waveform W1. In other words, as the frequency of waveform W1 increases, the output of circuit 116' increases. When the voltage output of circuit 116' is below the level of zener diode Z2, the signal to transistor 118' is constant and equal to the magnitude of voltage across zener diode Z2 less the drop through diode D5. When the voltage of circuit 116' rises above the level of zener diode Z2, it is supplied through diode D4 to circuit 118'. The circuit is arranged such that when the vehicle speed is relatively low (for example, 15 miles per hour or less) the zener diode voltage is supplied to circuit 118 thereby providing a fixed level of voltage at the collectors of the transistors Q0, Q10 . . . Q80. As the vehicle speed increases above 15 miles per hour, the signal supplied from circuit 116' increases thereby causing increased voltage to be supplied to the collectors of the transistors. Note that with increasing vehicle speed, the duty cycle of each energized LED decreases. However, the circuit operates to maintain a substantially constant energy input to each LED. Accordingly, variations in intensity of light emitted by the individual LED are minimized to a point where the LED's always provide generally uniform illumination throughout the whole operative range of the display. A display having this uniform intensity is more pleasing and less distractive to an observer than a display wherein the illumination intensity varies as the number of LED's lighted varies.

Alarm circuit 132 provides a novel overspeed alarm for indicating when vehicle speed exceeds a predetermined value. The illustrated circuit comprises resistors R17, R18, R19, R20, R21, R22 and R23, a diode D9, a capacitor C6, a transistor 132''', and two circuits 129, 132' identified in the parts list and having terminal pins identified according to the manufacturer's designation. An alarm 132'' is also included, preferably an audible alarm. With these circuit elements connected as illustrated in the drawing, alarm 132'' begins to sound when the vehicle speed reaches 72.5 miles per hour. It will be observed that the inputs to circuit 132' are operatively coupled to sense a "7" from the more significant digit section 130 and a "2.5" from the less significant digit section. Thus when the count in the counter reaches the 72.5 mile per hour level, the alarm 132'' sounds. Since the signal from the less significant digit section to circuit 132' remains in the same condition until a speed of 77.5 miles per hour is reached, circuit 132' is effectively operated for speeds between 72.5 and 77.5 miles per hour. Note that as the vehicle speed is travelling between 72.5 and 75 miles per hour that circuit 132' is operated for a certain fraction of each timing period, but that when the vehicle is travelling between 75 and 77.5 miles per hour this fraction increases. Thus the alarm is increasingly sounded as vehicle speed increases above the 72.5 mile per hour level. This feature is especially advantageous for it can provide an increasingly annoying alarm to the driver as he increases the speed of the vehicle above the predetermined level up to 77.5 miles per hour. It is contemplated that the alarm circuit could be used to operate other accessory equipment such as sounding a vehicle horn, flashing a vehicle light, to provide an external signal that the vehicle is speeding. It will be appreciated that other variations on the alarm circuit are possible.

In accordance with a further feature of invention, the timing period defined by waveform W3 can be set to calibrate the speedometer for the specific tire size employed on the vehicle. This can be done by providing circuit 114 with an adjustable element which may be adjusted to vary the timing period defined by waveform W3. When the tire size of the vehicle is changed, the speedometer system may be quickly calibrated by adjusting the timing period defined by waveform W3. Thus it is wholly unnecessary to replace elements of the speedometer system as would be required in a mechanical type speedometer system.

From the foregoing description of the preferred embodiment it can be seen that a novel and especially advantageous system has been provided. While the inventive concepts involved are particularly well suited for automotive systems such as speedometers, etc., it will be appreciated that the same may be also applied to other areas of instrumentation. Furthermore, the invention is susceptible to various specific embodiments wherein different numbers of LED's and different counting and decoding arrangements are employed. For example, it will be remembered that a two digit counter has been disclosed. Note that the term "digit" could include a system having a base of ten, such as provided by the more significant digit section, or a different base such as the base four provided by the less significant digit section of the counter. Furthermore, other decoding schemes could be used other than the particular decoding illustrated.

It is to be understood that the foregoing description is that of a preferred embodiment of the invention. Various changes and modifications may be made without departing from the spirit and scope of the invention as defined by the appended claims.

PARTS LIST

| | |
|---|---|
| Transistors Q0, Q10 | |
| Q80, Q2.5, Q5, Q7.5, 132''' | 2N5306 |
| Transistor 106' | 2N5814 |
| Transistor 118' | 2N5815 |
| Transistor 118'' | D40K1 |
| Resistors R$_T$ | 33 ohms |
| Resistor R$_{t'}$ | 15 ohms |
| Resistor R1 | 4.7K |
| Resistor R2 | 27 ohms |
| Resistors R3, R9 | 10 K |
| Resistors R4, R14 | 240K |
| Resistor R5 | 2.7M |
| Resistor R6 | 20K |
| Resistors R7, R21 | 120K |
| Resistor R8 | 820K |
| Resistors R10, R16 | 1K |
| Resistors R11, R17 | 300K |
| Resistor R12 | 39K |
| Resistor R13 | 2M |
| Resistor R15 | 18K |
| Resistor R18 | 220K |
| Resistor R19 | 510K |
| Resistor R20 | 1.5M |

-Continued

PARTS LIST

| | |
|---|---|
| Resistor R22 | 560 ohms |
| Resistor R23 | 15 ohms |
| Capacitor C1 | 22 microf. |
| Capacitors C2, C3 | 0.001 microf. |
| Capacitors C4, C5, C6 | 0.1 microf. |
| Diodes D1, D3, D4, D5 D6, D7, D8, D9 | 1N914 |
| Diode D2 | 1N4001 |
| Zener Z1 | 1N5244 |
| Zener Z2 | 1N5230 |
| LED's | RL50 (LITRONICS) |
| Circuits 112', 114', 116', 132' | LM 3900 (NATIONAL) |
| Circuits 120, 122 | CD 4013 (RCA) |
| Circuit 130 | CD 4017 (RCA) |
| Circuits 124, 126, 128, 129 | CD 4001 (RCA) |

I claim:

1. A metering and display system for metering and displaying the value of a parameter comprising: a visual display of a scale representing a range of said parameter and a plurality of elements each of which elements is adapted to emit light when in an energized condition, said elements being arranged in visual association with said scale to form a column coextensive with at least a portion of said scale; means for providing a signal having variations at a frequency representative of the value of said parameter; counting means for counting said variations during a predetermined time interval and a plurality of driver means for intermittently and repetitively energizing each of a selected number of elements along the column formed by said elements such that the elements in said selected number of elements appear to an observer to be continuously lighted, each of said plurality of driver means being adapted to energize differing ones of said elements at differing times during one predetermined time interval so that there are fewer of said driver means than said elements, said selected number of elements being determined by the frequency of said signal whereby the lighted elements form a lighted column which may be read by an observer against the scale to determine the value of said parameter.

2. A metering and display system as claimed in claim 1 wherein said elements are light emitting diodes.

3. A metering and display system as claimed in claim 1 wherein said means for intermittently and repetitively energizing each of a selected number of said elements comprises means for sequentially energizing said elements in said selected number of elements in the direction of increasing value of said parameter as read on said scale.

4. A metering and display system as claimed in claim 1 wherein said elements are sequentially energized beginning with the element visually associated with the lowest value of said parameter on the portion of said scale range with which said elements are coextensive.

5. A metering and display system as claimed in claim 1 wherein said elements in said selected number of elements are consecutive along the column.

6. A metering and display system as claimed in claim 1 wherein said means for intermittently and repetitively energizing each of a selected number of said elements comprises means for sequentially energizing said elements in said selected number of elements in the direction of increasing value of said parameter along said scale range beginning with the element visually associated with the lowest value of said parameter on the portion of said scale range with which said elements are coextensive.

7. A metering and display system as claimed in claim 6 wherein said elements of said selected number of elements are consecutive along the column.

8. A metering and display system as claimed in claim 7 wherein said elements are light emitting diodes.

9. A metering and display system as claimed in claim 1 wherein said portion of said scale along which said elements are coextensive covers a range of values of said parameter from a first value to a second value, said second value being higher than said first value, and said elements are arranged along said portion of said scale in uniform increments of the value of said parameter.

10. A metering and display system as claimed in claim 9 wherein said elements are arranged in equally spaced increments along said column.

11. A metering and display system as claimed in claim 9 wherein said means for intermittently and repetitively energizing each of a selected number of said elements comprises means for sequentially energizing said elements beginning with the element visually associated with said first value.

12. A metering and display system as claimed in claim 11 wherein said energizing means energizes certain of said elements of said selected number of elements for a slightly longer time than other elements of said selected number of elements.

13. A metering and display system as claimed in claim 12 wherein said certain elements are arranged at uniform intervals along said column and separated by other elements.

14. A metering and display system as claimed in claim 13 wherein said energizing means energizes each of said certain elements so long as any one of the immediately succeeding other elements before the immediately succeeding one of said certain elements is energized.

15. A metering and display system as claimed in claim 10 wherein the duration of energization of each individual element decreases as said selected number of elements increases, and vice versa.

16. A metering and display system as claimed in claim 15 further including means for maintaining the intensity of each of said elements substantially invariant as the duration of energization thereof changes.

17. A metering and display system as claimed in claim 1 wherein the duration of energization for each individual element decreases as said selected number of elements increases, and vice versa.

18. A metering and display system as claimed in claim 17 further including means for maintaining the intensity of each of said elements substantially invariant as the duration of energization thereof changes.

19. A metering and display system as claimed in claim 1 including alarm means responsive to said selected number of elements exceeding a predetermined number for providing an alarm signal indicative that the value of said parameter is exceeding the value represented by said predetermined number of elements.

20. A metering and display system as claimed in claim 19 wherein said alarm means comprises means for generating said alarm signal in an audible form.

21. A metering and display system as claimed in claim 20 wherein said alarm means is arranged and constructed such that as the value of said parameter increases beyond the value represented by said predetermined number of elements, a selected characteristic of said audible alarm signal changes in accordance with the increasing value of said parameter.

22. A metering and display system for metering and displaying the value of a parameter being measured, said system comprising a visual display comprising a linear array of individual energizable elements, each of said elements emitting light when energized, and circuit means for intermittently and repetitively energizing a selected number of said elements, which selected number is determined by the value of the parameter being measured, said circuit means comprising means for developing a repetitive signal whose repetition rate represents the value of the parameter being measured, means for establishing a repetitive timing period, counting means for counting the number of times said signal occurs during each timing period, said counting means comprising a plurality of outputs which are selectively energized in accordance with the count in said counting means, means operatively coupling the outputs of said counting means with said elements of said array such that said selected number of elements are sequentially energized as the count in said counting means progresses and each of the individual elements in said selected number of elements is energized for only a fraction of the timing period with the duration of energization of each of said elements in said selected number of elements decreasing as the number of elements in said selected number of elements increases in response to increase in the value of said parameter, and vice versa, said timing period being of such duration that the individual elements appear to an observer as being continuously energized, and means further including illumination control circuit means responsive to variations in the value of said parameter for providing substantially constant intensity of illumination from said elements in said selected number of elements as the number of elements in said selected number of elements varies in response to variations in the value of said parameter.

23. A metering and display system as claimed in claim 22 wherein said illumination control circuit means comprises means for maintaining a generally uniform energy input to each of said elements in said selected number of elements as the number of elements in said selected number of elements varies in response to variations in the value of said parameter.

24. A metering and display system as claimed in claim 23 wherein said illumination control circuit means comprises means for supplying a voltage to each of said elements of said selected number of elements which voltage is established in accordance with the value of said parameter.

25. A metering and display system as claimed in claim 24 wherein said illumination control circuit means includes tach circuit means responsive to the repetition rate of said signal for establishing the voltage applied to each of said elements of said selected number of elements.

26. A metering and display system as claimed in claim 25 wherein said tach circuit means causes the voltage applied to said elements of said selected number of elements to increase once the number of elements in said selected number of elements exceeds a predetermined number.

27. A metering and display system as claimed in claim 26 wherein said illumination control circuit means comprises amplifying means responsive to said tach circuit means for providing said voltage to said elements in said selected number of elements in accordance with the output of said tach circuit means.

28. A metering and display system for metering and displaying the value of a parameter comprising: a visual display of a scale representing a range of values of said parameter and a plurality of elements each of which elements is adapted to admit light when in an energized condition, said elements being arranged in visual association with said scale to form a column coextensive with at least a portion of said scale with certain of said elements representing predetermined multiples of the value of said parameter and the other elements representing intermediate values of said parameter; means for providing a signal having a characteristic representative of the value of said parameter; timing circuit means defining a repetitive timing period; a counting circuit means operatively coupled with said means for providing said signal such that the counting rate of said counting circuit means varies with the value of the parameter; said counting circuit means and said elements of said array being arranged and constructed and operatively coupled together such that a selected number of elements in said array are energized during each timing period, said selected number being determined by the value of said parameter, said selected number of elements being energized such that during each timing period a new element in said selected number of elements is temporarily energized for a fraction of the timing period each time the count in said counting circuit means changes, the duration for which each element of said selected number of elements is temporarily energized being such that each element appears to be continuously lighted whereby the lighted elements form a lighted column which may be read by an observer against the scale to determine the value of said parameter, said energizing means further energizing each of said certain elements representative of predetermined multiple values so long as any one of the immediately succeeding other elements representative of intermediate values is energized before the energization of the immediately succeeding one of said certain elements representative of predetermined multiple values.

29. A metering and display system as claimed in claim 28 wherein said elements in said selected number of elements are energized such that not more than a majority thereof are energized at any time during each timing period.

30. A metering and display system as claimed in claim 28 wherein said energizing means energizes each of said elements in said selected number of elements by electrical current such that over at least a portion of said range of values the electrical current to each of said elements increases in magnitude as the duration of energization of each of the individual elements decreases.

31. A metering and display system as claimed in claim 28 wherein said counting circuit means comprises a more significant digit counting section associated with said certain elements and a less significant digit counting section associated with said other elements.

32. A metering and display system as claimed in claim 31 wherein said energizing means energizes said certain elements of the display which are operatively coupled with said more significant digit counting section of said counting circuit means for a longer duration than are said other elements in said selected number of elements.

33. A metering and display system as claimed in claim 28 wherein said timing circuit means comprises means for setting the duration of the timing period whereby the timing period may be set to calibrate the metering and display system.

34. Metering and display apparatus for metering and displaying the value of a parameter being measured, said apparatus comprising: a timing circuit means for establishing a repetitive timing period; a data signal means for providing a repetitive data signal whose repetition rate is representative of the value of the parameter being measured; a series lighting display composed of a plurality of individual energizable elements each of which emits light when energized; and circuit means operatively coupling said timing circuit means, said data signal means and said display such that during each timing period each occurrence of said data signal causes a different one of said elements along the display to be temporarily energized, the duration of energization of each element being only a fraction of each timing period but the duration of each timing period being such that the elements in the display which are energized during each timing period present to an observer the appearance of being continuously lighted whereby the elements so energized provide a display representative of the value of the parameter being measured, said circuit means being adapted to energize certain of said elements of said selected number of elements for a slightly longer time than other elements of said selected number of elements.

35. Metering and display apparatus as claimed in claim 34 wherein said series lighting display is composed of a plurality of light emitting diodes.

36. Metering and display apparatus as claimed in claim 34 wherein the elements energized along the display during each timing period are consecutive along the display.

37. Metering and display apparatus as claimed in claim 36 wherein the consecutive elements which are energized along the display are consecutively energized with each occurrence of said data signal.

38. A metering and display apparatus as claimed in claim 34 wherein said certain elements are arranged at uniform intervals along said column and separated by other elements.

39. A metering and display apparatus as claimed in claim 38 wherein each of said certain elements remains energized so long as any one of the immediately succeeding other elements before the immediately succeeding one of said certain elements is energized.

40. A metering and display apparatus as claimed in claim 39 wherein the duration of energization of each individual element decreases as said selected number of elements increases, and vice versa.

41. A metering and display apparatus as claimed in claim 40 further including means for maintaining the intensity of each of said elements substantially invariant as the duration of energization thereof changes.

42. A speedometer system for indicating the speed of a vehicle comprising: a visual display of a speed scale representing a range of vehicle speeds and a plurality of elements each of which elements is adapted to emit light when in an energized condition, said elements being arranged in visual association with said speed scale to form a column coextensive with at least a portion of said speed scale; means for providing a speed signal having a characteristic representative of vehicle speed; means for intermittently and repetitively energizing each of a selected number of elements along the column formed by said elements such that the elements in said selected number of elements appear to an observer to be continuously lighted and such that the duration of energization of each individual element decreases as said selected number of elements increases, and vice versa, said selected number of elements being determined by said characteristic of said speed signal whereby the lighted elements form a lighted column which may be read by an observer against the speed scale to determine vehicle speed, and means for maintaining the apparent visual intensity of each of said elements substantially invariant as the duration of energization changes by altering the degree of energization of said elements with changes in the duration of energization.

* * * * *